United States Patent
Beer et al.

(10) Patent No.: US 9,255,618 B2
(45) Date of Patent: Feb. 9, 2016

(54) INTERNALLY VENTILATED MOTOR VEHICLE BRAKE DISC MADE OF FIBRE COMPOSITE MATERIAL

(71) Applicant: Continental Teves & AG & Co. oHG, Franfurt (DE)

(72) Inventors: Wilhelm Beer, Rüsselsheim (DE); Wolfgang Frank, Altenstadt (DE); Frank Hollstein, Undenheim (DE); Bianca Stauzebach, Liederbach am Taunus (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/378,104

(22) PCT Filed: Feb. 14, 2013

(86) PCT No.: PCT/EP2013/052951
§ 371 (c)(1),
(2) Date: Aug. 12, 2014

(87) PCT Pub. No.: WO2013/120942
PCT Pub. Date: Aug. 22, 2013

(65) Prior Publication Data
US 2015/0014104 A1    Jan. 15, 2015

(30) Foreign Application Priority Data

Feb. 14, 2012 (DE) .......................... 10 2012 202 238
Jan. 28, 2013 (DE) .......................... 10 2013 201 303

(51) Int. Cl.
*F16D 65/12* (2006.01)
*F16D 69/04* (2006.01)
(Continued)

(52) U.S. Cl.
CPC ............ *F16D 65/128* (2013.01); *F16D 65/125* (2013.01); *F16D 65/126* (2013.01);
(Continued)

(58) Field of Classification Search
CPC ................... C04B 35/56; C04B 35/57; C04B 35/80–35/83; F16D 69/02; F16D 65/12; F16D 2065/132; B29C 70/04
See application file for complete search history.

(56) References Cited

U.S. PATENT DOCUMENTS 3,623,579 A    11/1971    Hendrickson et al.
3,724,613 A *  4/1973    Bermingham .......... 188/218 XL
(Continued)

FOREIGN PATENT DOCUMENTS

DE    32 44 073 C1    5/1984
DE    42 37 655 A1    5/1994
(Continued)

OTHER PUBLICATIONS

Breuer, Bert & Bill, Karlheing H. "Bremsenhandbuch-Grundlagen, Komponenten, Systeme, Fahrdynamik," Issue 3, pp. 240-242, Germany.
(Continued)

*Primary Examiner* — Christopher Schwartz
(74) *Attorney, Agent, or Firm* — RatnerPrestia

(57) ABSTRACT

An internally ventilated motor vehicle brake disc which includes at least in parts of a fiber composite material, having two parallel friction surfaces on one or more friction rings with cooling channels, wherein the friction ring or rings are arranged on a brake disc hub in a non-rotating manner, and wherein the two friction surfaces include fiber composite material, a disc-shaped carrier for the friction surfaces is provided parallel to the friction surfaces, and wherein the carrier is connected to the brake disc hub as one piece.

11 Claims, 9 Drawing Sheets

(51) Int. Cl.
*F16D 65/847* (2006.01)
*F16D 65/02* (2006.01)

(52) U.S. Cl.
CPC ............ *F16D65/127* (2013.01); *F16D 65/847* (2013.01); *F16D 69/0408* (2013.01); *F16D 2065/132* (2013.01); *F16D 2065/1328* (2013.01); *F16D 2065/1348* (2013.01)

(56) References Cited

U.S. PATENT DOCUMENTS

| | | | |
|---|---|---|---|
| 3,730,304 A | | 5/1973 | Buyze |
| 3,743,069 A | * | 7/1973 | Barnett et al. ............ 192/107 M |
| 3,956,545 A | * | 5/1976 | Afflerbach et al. .............. 428/37 |
| 4,049,090 A | * | 9/1977 | Buell ........................ 188/251 M |
| 4,118,528 A | * | 10/1978 | Lowry ......................... 428/66.2 |
| 4,177,883 A | | 12/1979 | Margetts |
| 5,005,676 A | | 4/1991 | Gassiat |
| 5,217,770 A | * | 6/1993 | Morris et al. ................. 428/36.3 |
| 5,546,880 A | * | 8/1996 | Ronyak et al. ............ 112/475.01 |
| 6,308,808 B1 | | 10/2001 | Krenkel et al. |
| 6,935,470 B1 | | 8/2005 | Smith, Jr. |
| 2003/0146059 A1 | * | 8/2003 | Goller et al. ............ 188/218 XL |
| 2004/0035659 A1 | * | 2/2004 | Pacchiana et al. ......... 188/264 R |
| 2011/0056777 A1 | | 3/2011 | Woychowski et al. |
| 2012/0058363 A1 | * | 3/2012 | Verpoort et al. .............. 428/649 |

FOREIGN PATENT DOCUMENTS

| | | |
|---|---|---|
| DE | 44 38 456 A1 | 5/1996 |
| DE | 197 19 634 C1 | 3/1999 |
| DE | 198 34 704 A1 | 2/2000 |
| DE | 199 31 140 A1 | 2/2000 |
| DE | 199 01 215 A1 | 7/2000 |
| DE | 101 57 583 C1 | 12/2002 |
| DE | 600 06 292 T2 | 8/2004 |
| EP | 1 180 613 A2 | 2/2000 |
| JP | S 61-48622 A | 3/1986 |
| JP | 2003-294066 A | 10/2003 |

OTHER PUBLICATIONS

International Search Report for PCT/EP2013/052951 mailed May 24, 2013.
Written Opinion of International Searching Authority for PCT/EP 2013/052951 mailed May 24, 2013 (w/English translation).
German Search Report for DE 10 2013 201 303.5 dated Dec. 12, 2013.

* cited by examiner

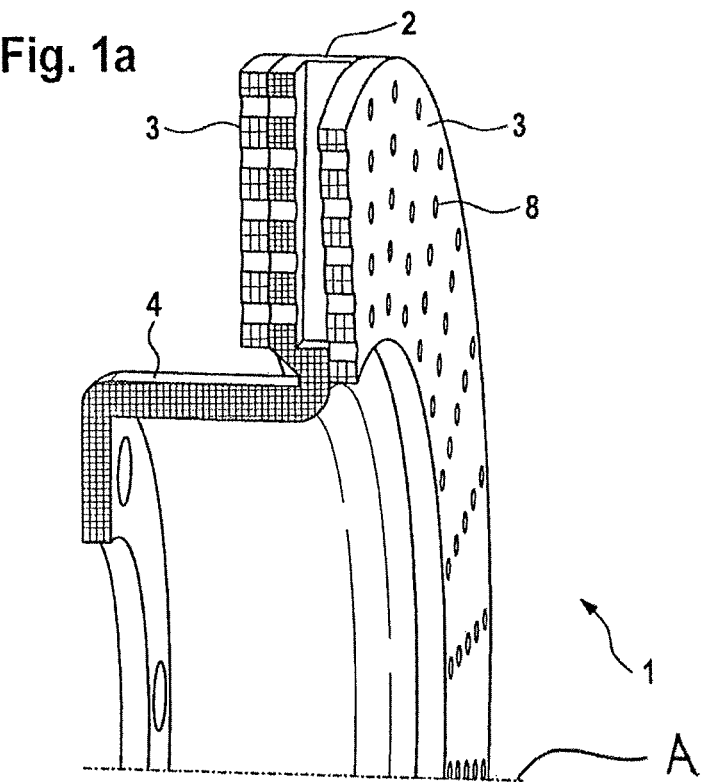
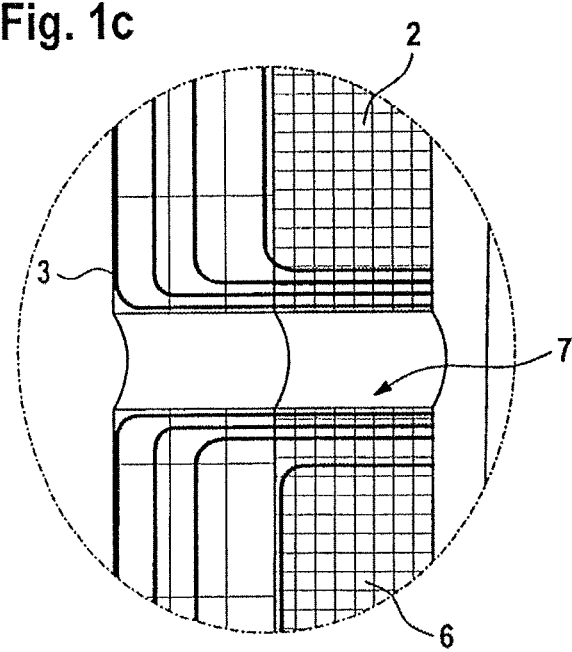
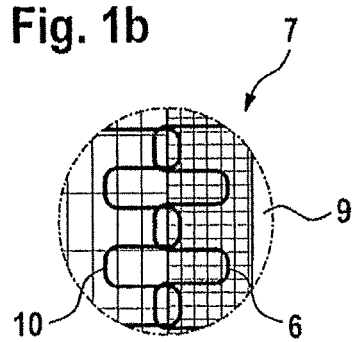

INTERNALLY VENTILATED MOTOR VEHICLE BRAKE DISC MADE OF FIBRE COMPOSITE MATERIAL

CROSS REFERENCE TO RELATED APPLICATIONS

This application is the U.S. National Phase Application of PCT/EP2013/052951, filed Feb. 14, 2012, which claims priority to German Patent Application Nos. 10 2012 202 238.4, filed Feb. 14, 2012 and 10 2013 201 303.5, filed Jan. 28, 2013, the contents of such applications being incorporated by reference herein.

FIELD OF THE INVENTION

The invention relates to an internally ventilated motor vehicle brake disk, which consists at least in parts of a fiber composite material, comprising two parallel friction surfaces on one or more friction rings with cooling channels, wherein the friction ring or rings are arranged for conjoint rotation on a hub.

BACKGROUND OF THE INVENTION

Brake disks which have internally ventilated carbon-ceramic friction rings are known from motor sport and from Bremsenhandbuch (Brake Handbook), Springer Verlag 2006, Breuer/Bill, page 420-426, which is incorporated by reference. A friction ring is formed from CMC material (Ceramic Matrix Composite). For this purpose, randomly oriented, short-staple carbon fibers are embedded in a silicon carbide matrix. The finished friction ring is screwed or clamped interchangeably on a brake disk hub made from stainless steel or aluminum material. Throughput and production are capable of improvement.

An integral motor vehicle brake disk of the type in question is known from DE 42 37 655 A1, which is incorporated by reference. In this case, two friction rings are connected to one another, wherein an outer friction ring consists of a fiber composite material and an inner friction ring together with the brake disk hub consists of a gray cast iron material, making it possible to obtain a tribologically favorable and also thermally durable composite construction with an improved weight balance. Countersunk rivets, in particular hollow rivets, are used to connect the friction rings.

The thermal performance of a brake system is primarily determined by the energy balance thereof in the region of the brake disks. In the case of conventional metallic brake disks, the phenomenon referred to as bowing under the effect of high temperature, in particular, can lead to unwanted vibration or uneven wear on brake pads. The connection between the brake disk hub and the friction ring is therefore particularly important. Sometimes, a separate design using different materials is recommended, additionally increasing the outlay on construction and complexity. Moreover, the geometry requirements on the brake disks have become considerably more stringent, given the high cost pressure and the necessary saving in weight, and it is therefore an object of the present invention to propose a further improved built-up motor vehicle brake disk of lightweight construction which takes particular account of the energy balance of sophisticated, particularly high-performance motor vehicles and allows lower-cost large-volume production.

SUMMARY OF THE INVENTION

An aspect of the invention includes two parallel friction surfaces comprised of infiltrated fiber composite material, a disk-shaped carrier for the friction surfaces is provided parallel to the friction surfaces, and wherein the carrier is connected integrally to the hub. It is advantageous that, in addition to standardized friction conditions for the two friction surfaces and a further improvement in the weight balance, the invention continues to allow advantageous production for all embodiments without necessarily relying on metallic lightweight materials.

One particular, advantage of the invention in comparison with DE 42 37 655 A1 is that a standard friction pad for the friction surfaces is made possible while retaining the vibration resistant design provided for the brake disk.

According to a preferred embodiment, the two friction surfaces are formed from identical silicon-infiltrated fiber composite material, and wherein the carrier is formed from an infiltrated fiber composite material or from a metallic material in an integrated construction which has an integral arrangement between the hub and the radially outer support for the material of the friction surfaces. Construction with infiltrated fiber composite material with the aid of pre-infiltrated prepregs allows particularly advantageous pre-manufacture and annealing in a manner which matches the stresses imposed and allows division of labor. Embodiment of the composite in conjunction with a metal carrier is distinguished especially by increased heat capacity reserves combined with visually appealing design and a reduced requirement for fiber composite material. As a particularly preferred option, an aluminum material is used for the carrier.

In another advantageous embodiment, the infiltrated fiber composite material is designed as a semifinished product, in the form of a woven or knitted fabric, which can be deformed three dimensionally without creasing, making it possible to provide a very largely crease-free, three dimensional and advantageous pre-form of the semifinished products in order to produce a green compact, it being possible to accomplish this by means of stamping or deep drawing processes, for example.

A design which is suitable for bearing the stresses imposed provides for the fiber composite material to be designed as a tubular woven fabric or knitted fabric. Together with the closed tubular structure of the woven/knitted fiber composite fabric used, a design of composite construction that is particularly suitable for bearing the stresses imposed, and a particularly favorable flow of forces are obtained by relatively simple means.

In a development of the invention, it is envisaged that the fiber composite material is in the form of a mono- or multi-filament arrangement. Thus, the requirements on the starting material can be accommodated by the fiber composite material in an advantageously variable manner without limitation to one particular starting material.

The specific embodiment of the brake disk can provide for the cooling channels each to be provided as radially open pockets between the friction surface and the carrier, and for the cooling channels to have a substantially rectangular ventilation cross section. The corresponding arrangement of the fiber composite material has an equally favorable effect on the ventilation and the stiffness of the brake disk.

To further improve the thermal balance, provision can be made according to the invention for the ventilation cross section of the cooling channels to increase, starting from an inlet opening provided radially on the inside, in the direction of an outlet opening provided radially on the outside.

For the specific embodiment of the pockets of the cooling channels, it is particularly advantageous if the carrier is of meandering, in particular bent, folded or offset, design radially on the outside of the brake disk hub, and wherein these bending or folding axes are arranged in a star shape, starting from a center of the carrier.

A particularly strong composite material structure is achieved if the participating adjacent filaments of the friction surface and of the carrier engage positively in one another with the aid of axially oriented filament connection sections, with the result that each filament connection section is in the form of a multi-layer multi-filament axial laid fiber structure. Through integrated fastening and reinforcement, this dovetail construction allows particularly high shear strength in the region of the filament connection sections without the use or installation of separate fastening means. Capacity for recycling is improved.

Strength is further increased if the filament connection sections are provided with positive fiber fixing, such as, in particular, crimping, knotting, weaving or interlinking, of the adjacent fiber filaments. To simultaneously improve thermal properties, it is advisable if an axially aligned cooling hole, which passes through the carrier and the friction surface material composite, is provided in each case concentrically with the center of a filament connection section.

BRIEF DESCRIPTION OF THE DRAWINGS

Further details of the invention will be apparent from dependent claims together with the description with reference to the drawing. In the drawing:

FIGS. 1-9 show a built-up brake disk of lightweight construction in various embodiments.

DETAILED DESCRIPTION OF THE INVENTION

Figure 2A:
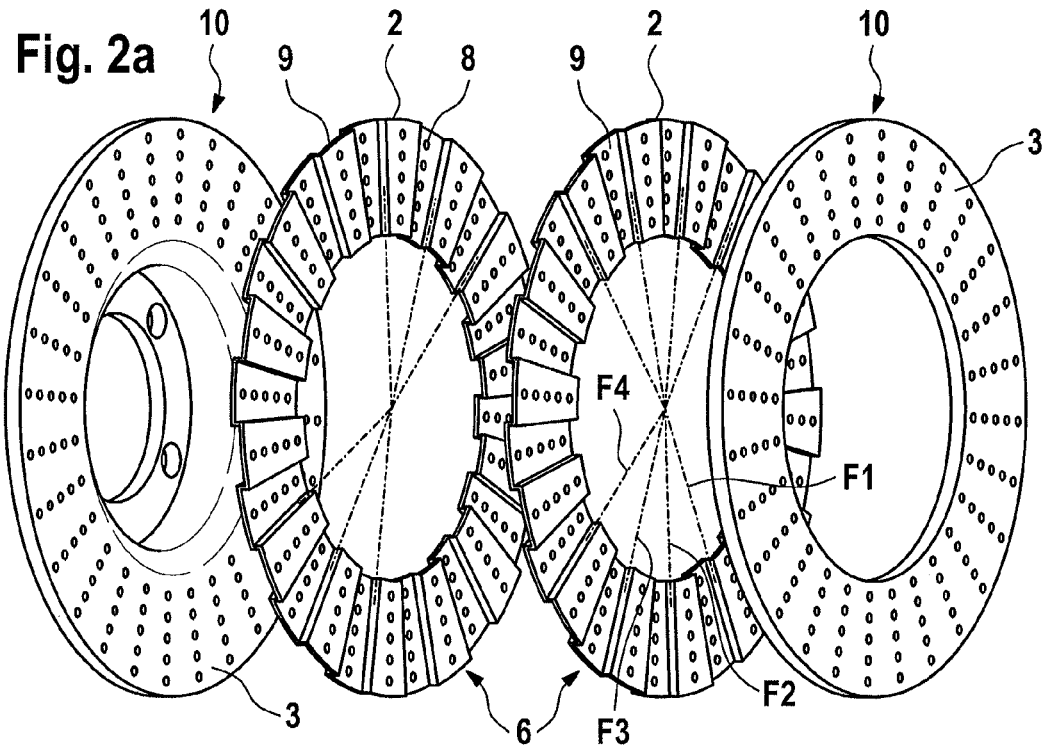
Figure 2B:
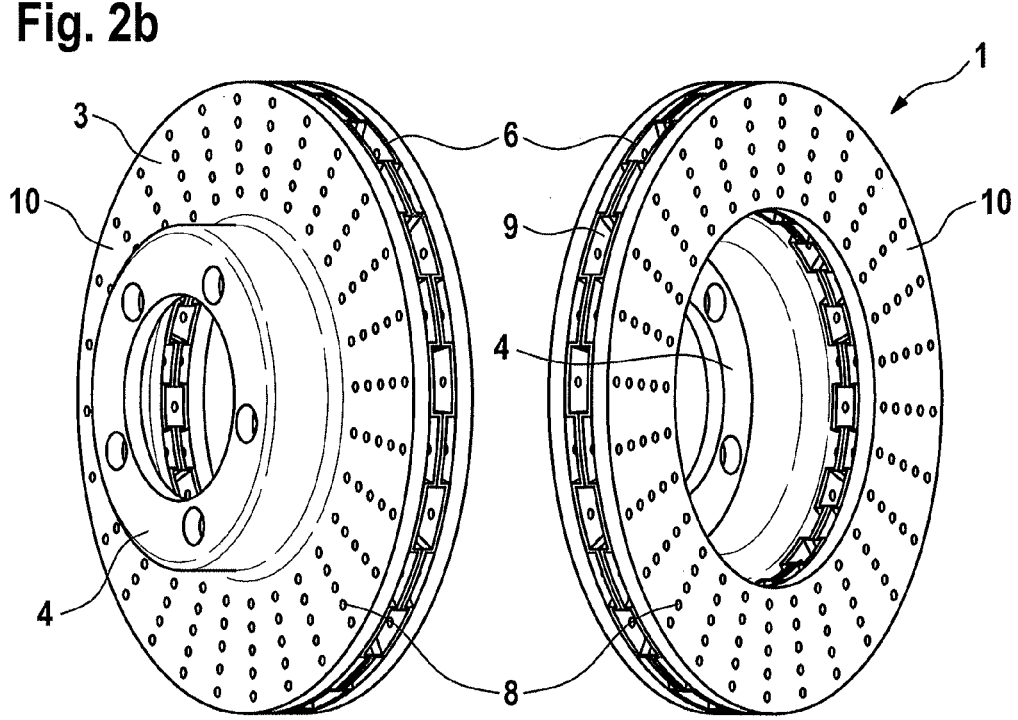
Figure 3A:
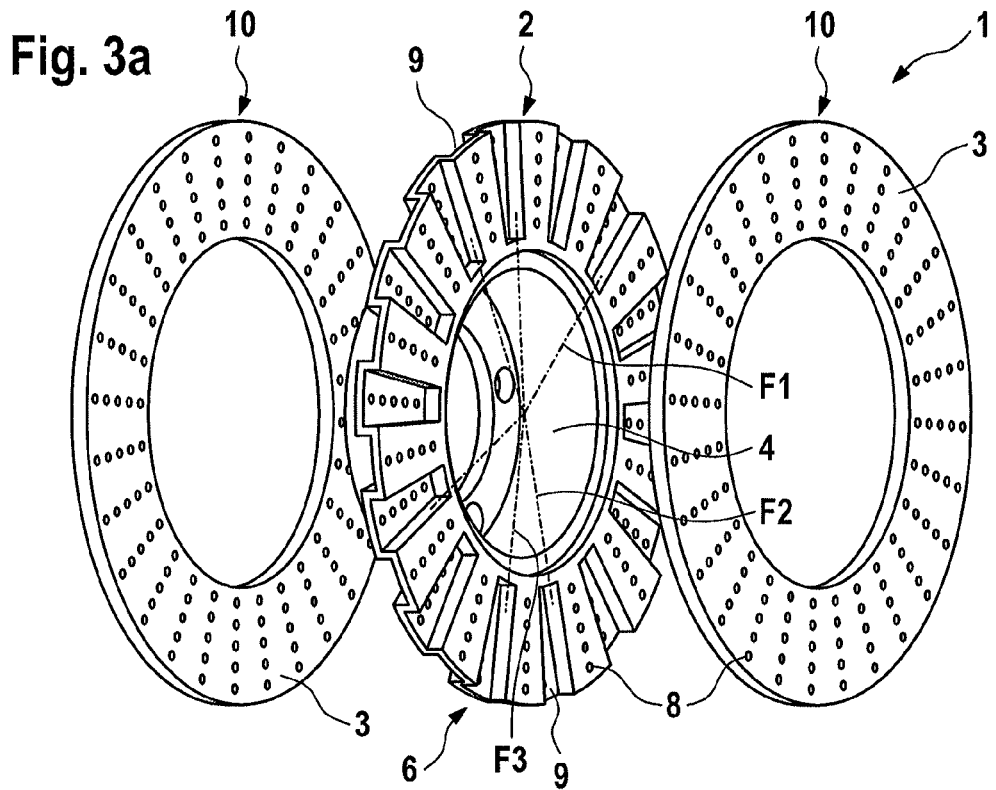
Figure 3B:
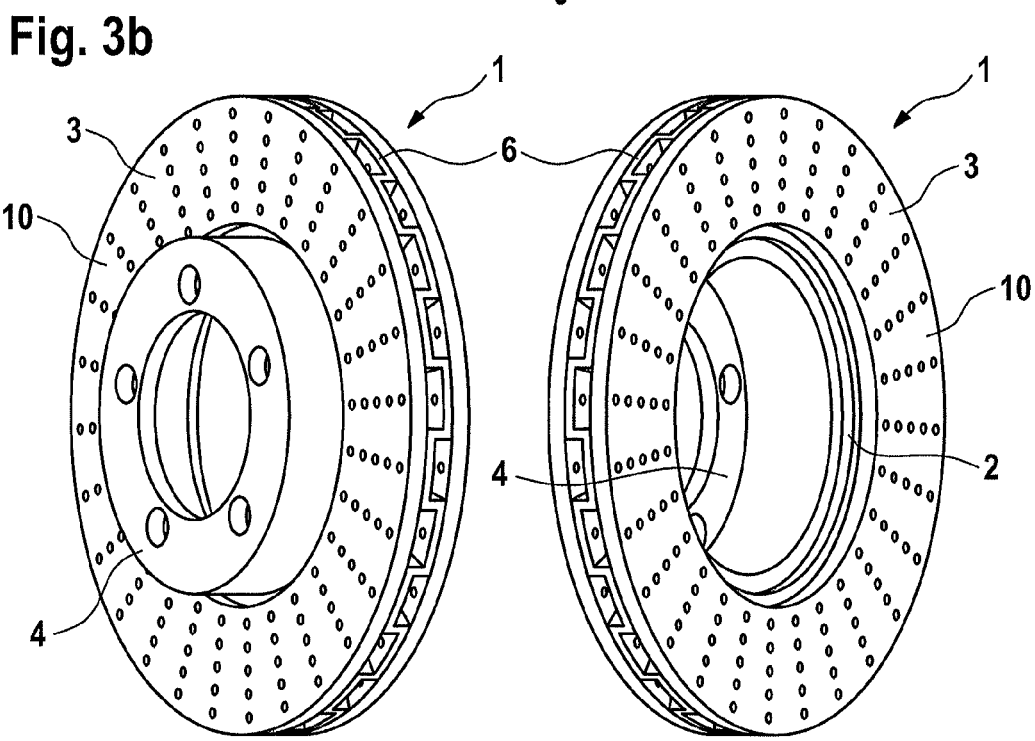
Figure 4A:
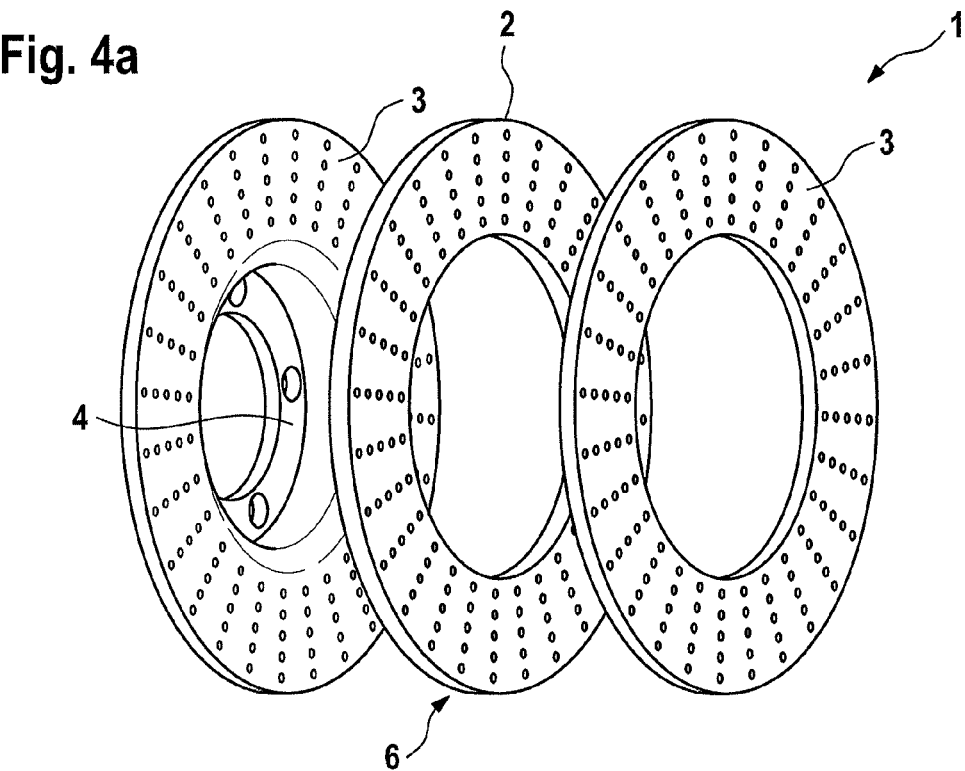
Figure 4B:
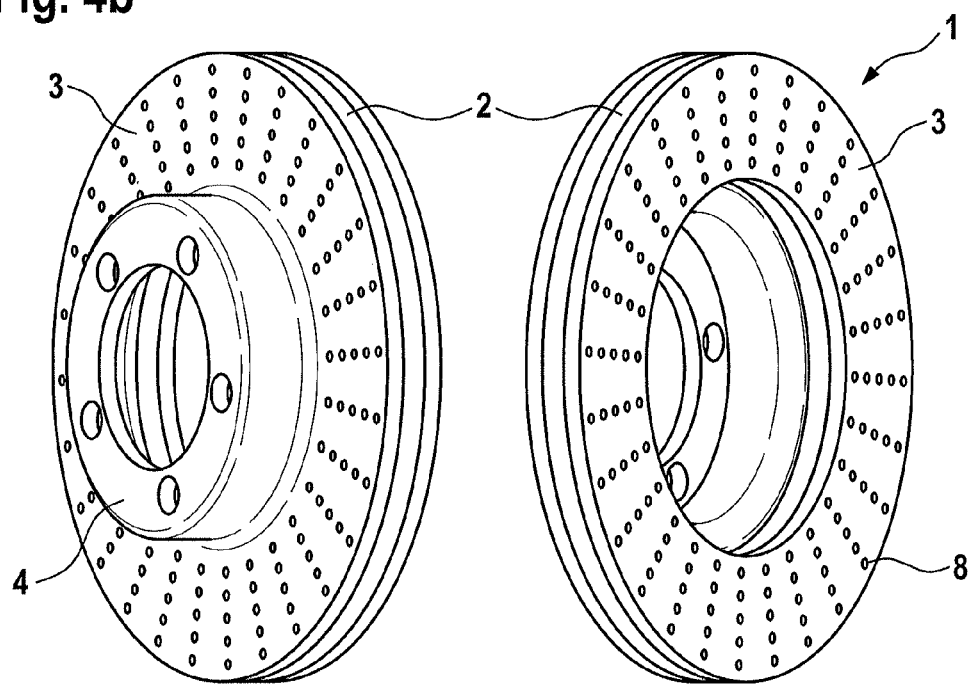
Figure 5A:
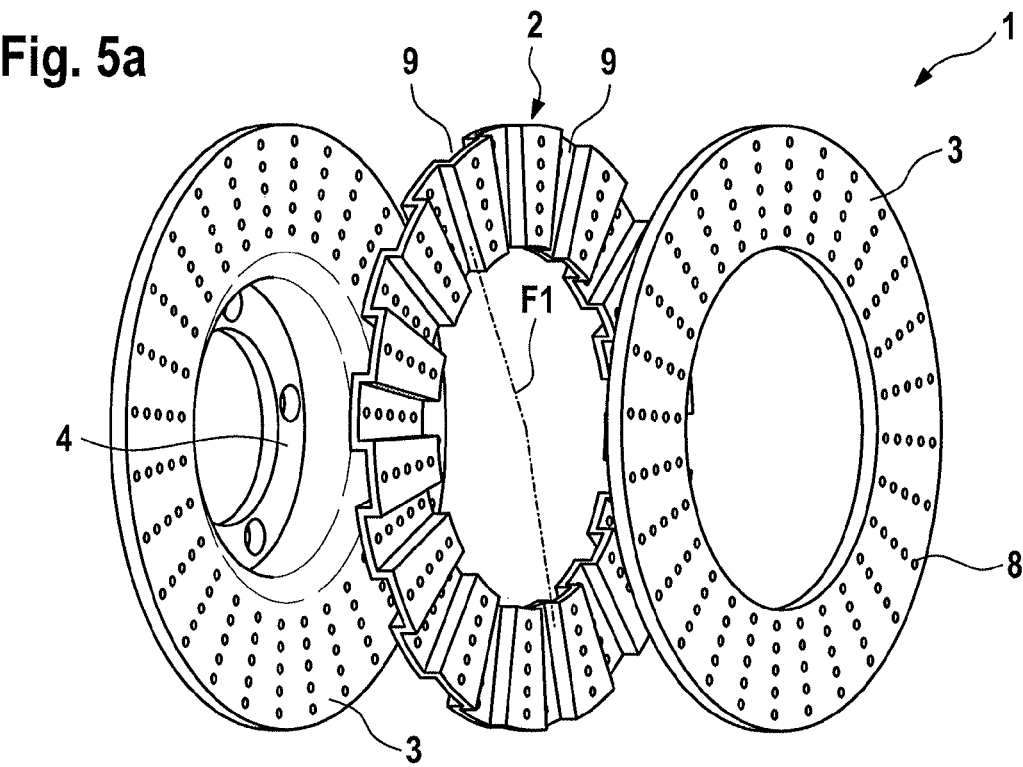
Figure 5B:
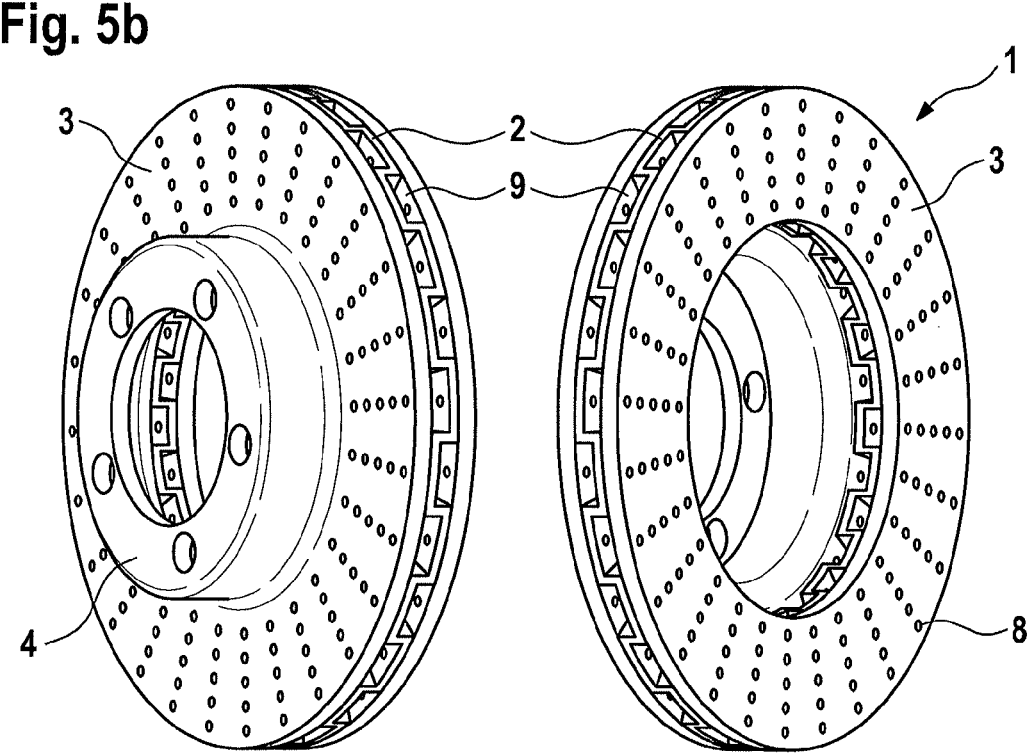

The invention relates to an internally ventilated motor vehicle disk brake 1 made from fiber composite material, which is assembled integrally for conjoint rotation from at least three parts and comprises two friction surfaces 3, which are provided in a plane-parallel configuration and are arranged orthogonally with respect to a wheel rotational axis A, and which form one or more friction rings, having a disk-shaped carrier 2 for the friction surfaces 3 and a brake disk hub 4, connected thereto, for the concentric, rotatable arrangement of the brake disk 1 around the wheel rotational axis A. Common to all the embodiments is the fact that the friction surfaces 3 of the brake disk 1 have a filament 10 made from carbon fiber composite material. In a largely flat arrangement behind the friction surfaces 3 is the carrier 2, the task of which is primarily to hold the material of the friction surfaces 3 parallel to and at a distance from one another to enable the cooling channels 9 to be formed between the two friction surfaces 3.

Figure 6A:
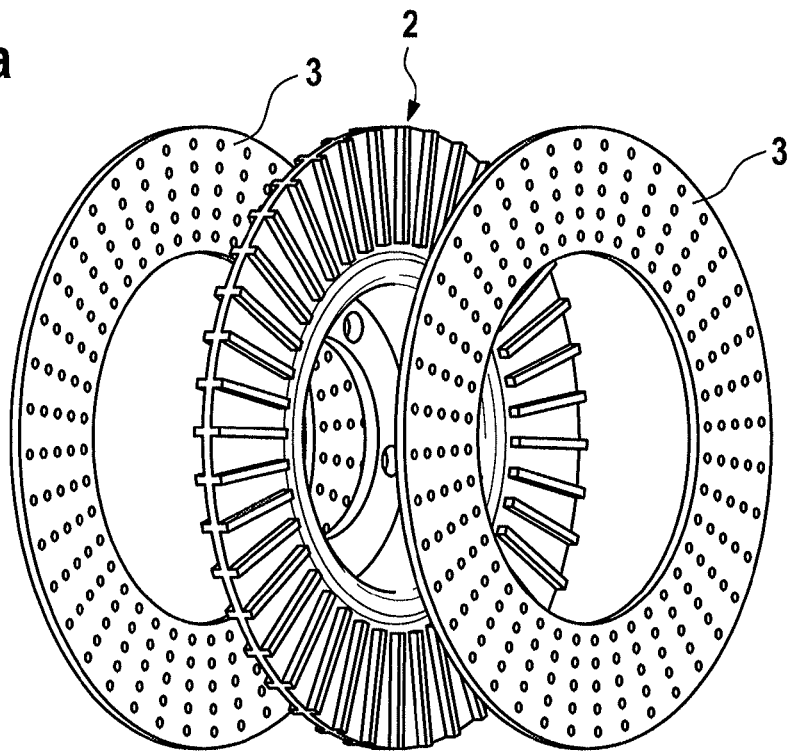
Figure 6B:
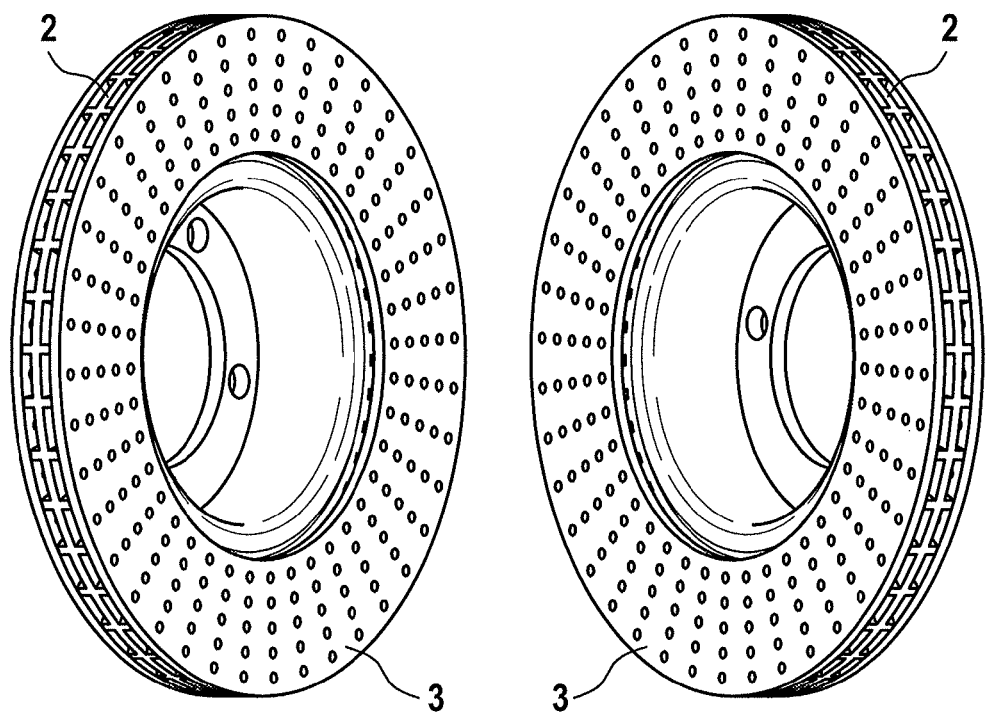
Figure 7A:
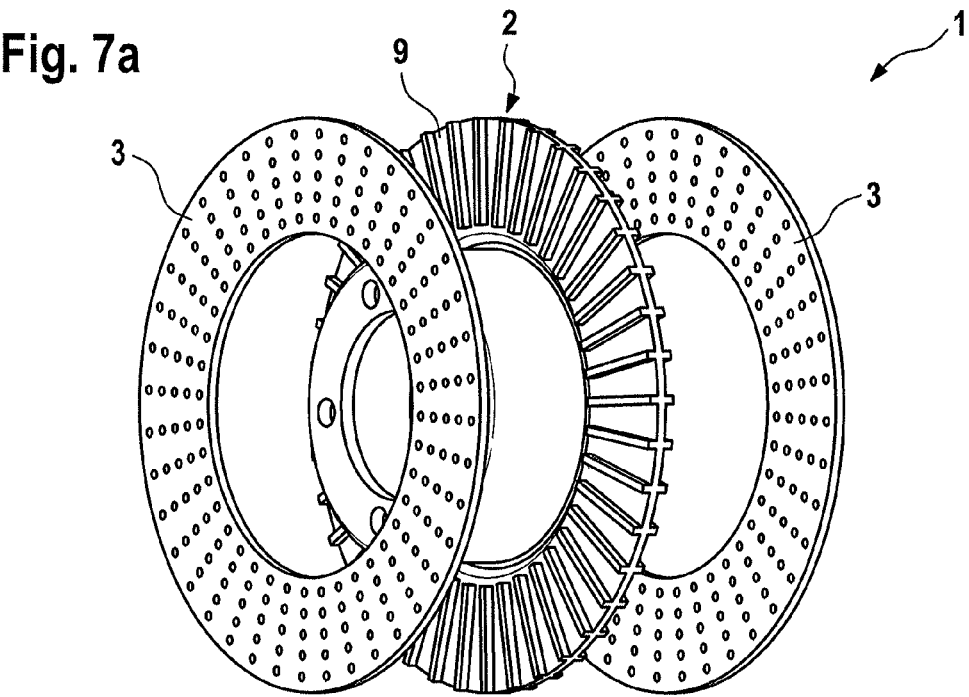
Figure 7B:
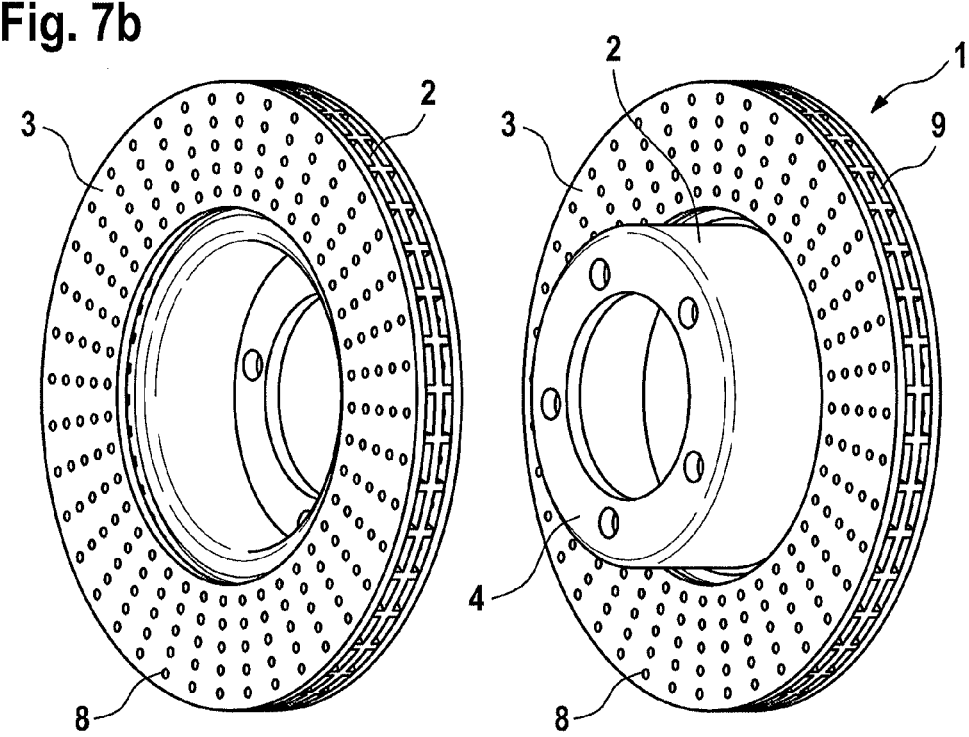
Figure 8A:
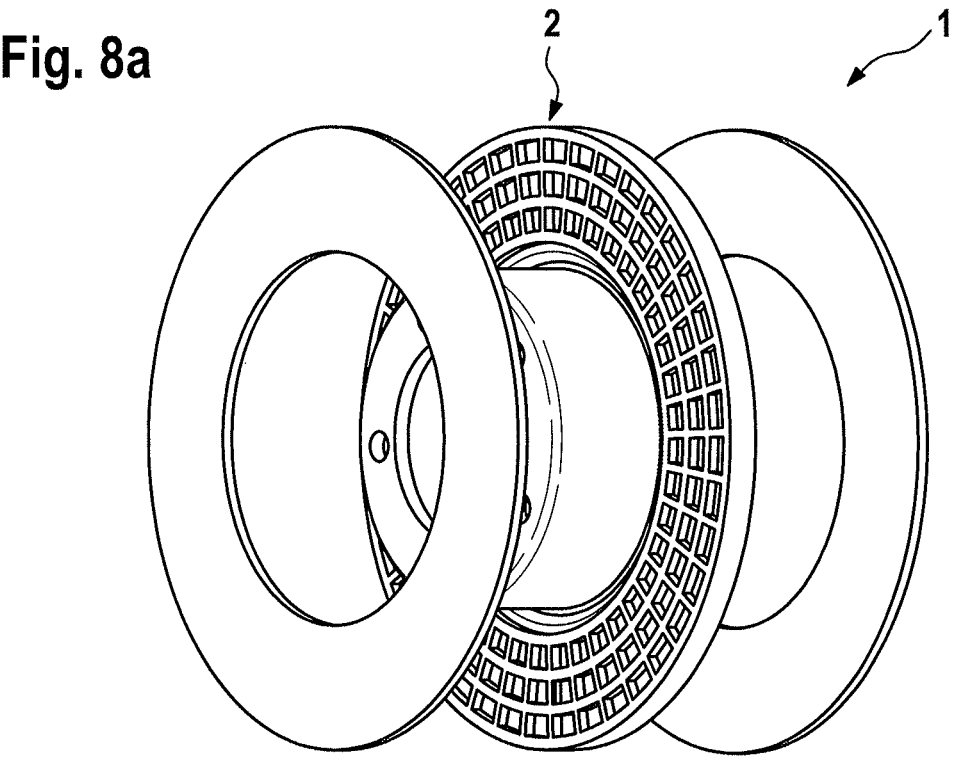
Figure 8B:
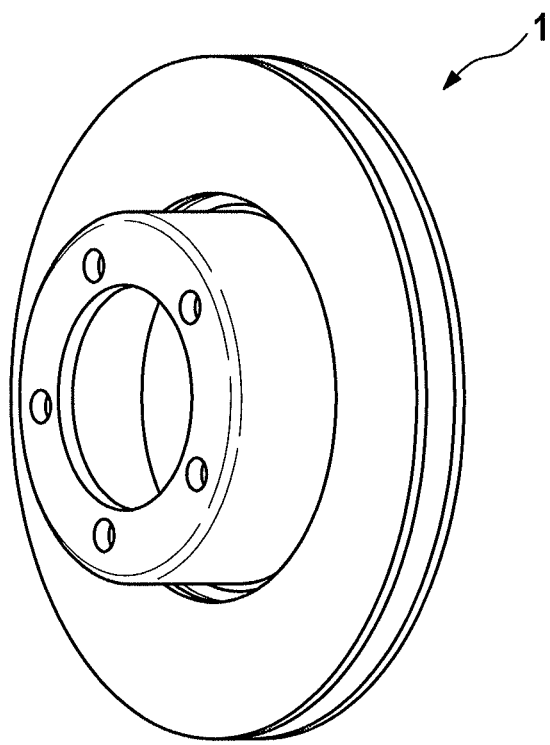

In conjunction with all the other features described, the embodiments available are ones in which the carrier 2 is formed integrally with the brake disk hub 4. In FIGS. 1a, b, c, the carrier is made from glass fiber filament 6. In another variant (FIG. 2a), the friction surface 3 which faces axially outward on the vehicle wheel is formed integrally with the brake disk hub 4 from a common fiber filament and the carrier 2 is constructed from two disks made from glass fiber material. In another variant, the carrier 2 and the brake disk hub 4 can also be constructed in one piece from an aluminum material (FIGS. 6a, b, 7a, b, 8a, b, 9a, b) or from glass fiber filament (FIGS. 1a, b, c, 3b).

The fiber composite material is provided as a multi-filar long-fiber woven fabric or knitted fabric, which can be provided for the carrier 2 made from glass fiber or carbon fiber. In addition, the fiber composite material is capable of being deformed and shaped three dimensionally without creases in such a way that a preassembled carbonized compact (green compact) of the brake disk 1 can be pre-manufactured with high precision and in a manner which involves the division of labor before the final high-temperature siliconization. As an additional feature, the filament can be of tubular design.

The cooling channels 9 are each provided as radially open pockets between the friction surface 3 and the carrier 2. The cooling channels 9 have a rectangular ventilation cross section, which is open at the ends in each case. The cross section increases radially from the inside outward. To simplify production of the cooling channels 9, the carrier 2 is of meandering, in particular bent, folded or offset, design. In this case, radially oriented bending or folding axes F1, F2, F3, FN are arranged in a star shape, starting from a center of the carrier 2.

The connection between the friction surfaces 3 and the various parts made from fiber composite material or aluminum is further improved by special filament connection sections 7. For this purpose, the proposal according to the invention is that the filaments of the friction surface 3 and the carrier 2 should engage positively in one another with the aid of axially oriented filament connection sections 7, with the result that each filament connection section 7 is in the form of a multi-filament axial laid structure of interengaging fibers. Each filament connection section 7 additionally reinforces the connection zone if the filament connection sections 7 have positive fiber fixing, such as, in particular, crimping with respect to one another, knotting, weaving or interlinking, of the adjacent fiber filaments. An axially aligned cooling hole 8, which passes through the carrier 2 and the friction surface material composite, can additionally be provided in each case in a center of a filament connection section 7.

Figure 9A:
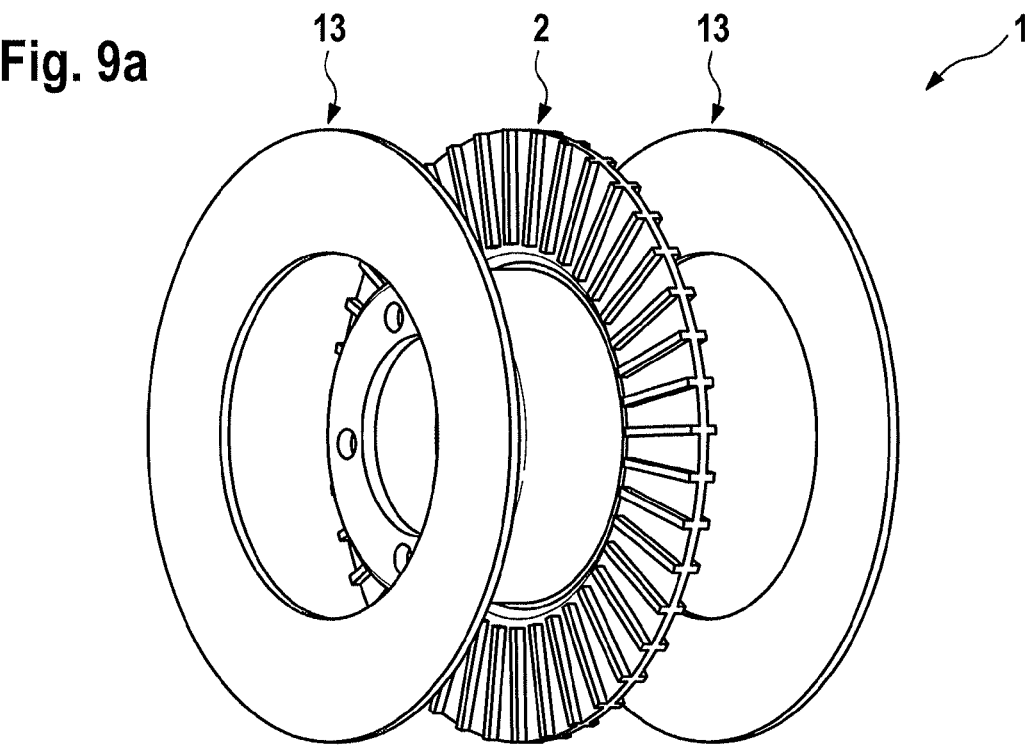
Figure 9B:
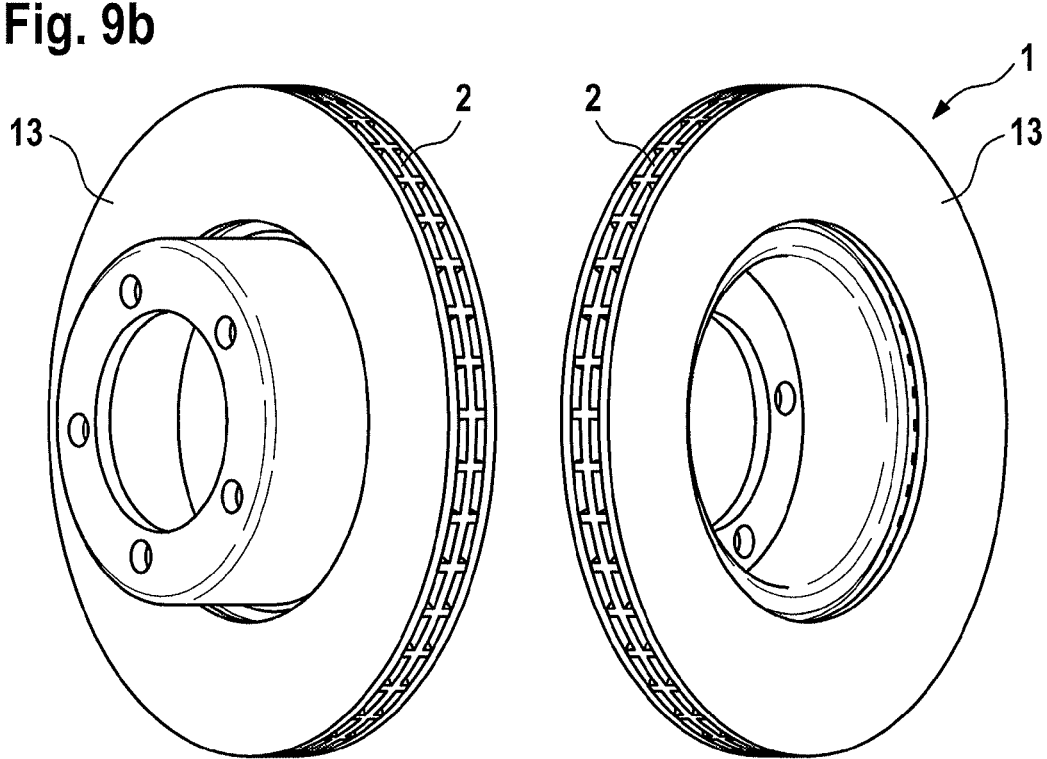

FIG. 9 illustrates a brake disk 1 in which the friction surfaces 13 are manufactured from friction lining material and are subject to wear.

It should be added that all the embodiments of the brake disk can be provided with particular advantage with a friction surface coating in the region of the top surface of their friction surfaces. This offers the advantage that the friction conditions can be adapted, matched and changed as required, in interaction with the brake linings, without having to change the other materials.

LIST OF REFERENCE SIGNS 1 motor vehicle brake disk
2 carrier
3 friction surface
4 brake disk hub
5
6 glass fiber filament
7 filament connection section
8 cooling hole
9 cooling channel
10 carbon fiber filament
13 friction surfaces made from friction lining material
A wheel rotational axis
F1 F2 F3 FN bending and folding axis

The invention claimed is:

1. An internally ventilated motor vehicle brake disk, which comprises at least in parts of a fiber composite material, comprising two mutually parallel friction surfaces on one or more friction rings with cooling channels, wherein the friction ring or rings are arranged concentrically and for conjoint rotation on a brake disk hub, which is provided concentrically with a wheel rotational axis, and the friction surfaces are arranged orthogonally with respect to the wheel rotational axis, wherein the two friction surfaces are comprised of fiber composite material, in that a disk-shaped carrier for the friction surfaces is provided parallel to the friction surfaces, and wherein the carrier is connected integrally to the brake disk hub, and wherein the fiber composite material is provided in a multi-filament arrangement, with filaments of each friction surface and filaments of the carrier engaged positively with one another through axially oriented filament connection sections, such that each filament connection section is in a form of a multi-filament axial laid fiber structure.

2. The internally ventilated motor vehicle brake disk as claimed in claim 1, wherein the two friction surfaces are formed from identical fiber composite material, and the carrier is formed from a fiber composite material or from a metallic material.

3. The internally ventilated motor vehicle brake disk as claimed in claim 1, wherein the two friction surfaces are formed from a carbon fiber composite material, and the carrier is formed from a glass fiber composite material or from an aluminum material.

4. The internally ventilated motor vehicle brake disk as claimed in claim 1, wherein the fiber composite material is designed as a long-fiber woven fabric or knitted fabric that can be deformed three dimensionally without creasing.

5. The internally ventilated motor vehicle brake disk as claimed in claim 4, wherein the woven fabric or knitted fabric is of tubular design.

6. The internally ventilated motor vehicle brake disk as claimed in claim 1, wherein the cooling channels are each provided as radially open pockets between the friction surface and the carrier, and the cooling channels have a rectangular ventilation cross section.

7. The internally ventilated motor vehicle brake disk as claimed in claim 6, wherein the ventilation cross section of the cooling channels increases from radially on the inside to radially on the outside.

8. The internally ventilated motor vehicle brake disk as claimed in claim 6, wherein the carrier is of meandering, bent, folded or offset, design to form the pockets for the cooling channels, and wherein folding axes are arranged in a star shape, starting from the wheel axis, which coincides with a center of the carrier.

9. The internally ventilated motor vehicle brake disk as claimed in claim 1, wherein the filament connection sections have positive fiber fixing, from at least one of crimping, knotting, weaving and interlinking, of the adjacent fiber filaments.

10. The internally ventilated motor vehicle brake disk as claimed in claim 1, wherein an axially aligned cooling hole, which passes through the carrier and the friction surface, is provided in each case in a center of a filament connection section.

11. The internally ventilated motor vehicle brake disk as claimed in claim 1, wherein at least one friction surface is provided with a friction surface coating.

* * * * *